United States Patent [19]
Koke

[11] Patent Number: 5,524,732
[45] Date of Patent: Jun. 11, 1996

[54] DEAD MAN'S BRAKE FOR HAND TRUCK

[76] Inventor: Richard Koke, 3 Hampton Ct., Queensbury, N.Y. 12804

[21] Appl. No.: 447,896

[22] Filed: May 23, 1995

[51] Int. Cl.$^6$ .................................................. B60T 1/02
[52] U.S. Cl. ...................... 188/22; 280/47.27; 188/332
[58] Field of Search ............................... 74/497, 500.5, 74/501.6, 502.2, 570; 188/2 D, 19, 21, 22, 78, 329, 332, 338, 339, 106 A; 280/43.12, 43.17, 47.17, 47.27

[56] References Cited

U.S. PATENT DOCUMENTS

| | | | |
|---|---|---|---|
| 2,823,921 | 2/1958 | Lagaard | 188/22 |
| 3,074,516 | 1/1963 | Wood | 188/119 |
| 3,608,922 | 9/1971 | Welland et al. | 280/43.12 |
| 3,977,500 | 8/1976 | Farr | 188/106 A |
| 5,390,943 | 2/1995 | Hedrick | 188/22 |
| 5,393,081 | 2/1995 | Mortenson | 188/22 |
| 5,398,396 | 3/1995 | Sanders et al. | 74/570 |

FOREIGN PATENT DOCUMENTS 5-238393  9/1993  Japan .

OTHER PUBLICATIONS

Koke Inc. letter, undated, facsimile transmitted: May 8, 1995.
Koke Inc. Invoice Series (on x) facsimile transmitted Apr. 12, 1995.

Primary Examiner—Robert J. Oberleitner
Assistant Examiner—Chris Schwartz
Attorney, Agent, or Firm—Schmeiser, Olsen & Watts

[57] ABSTRACT

A normally engaged (dead man's) brake for a manually operable pallet truck. A spring-biased, levered cam is housed within a wheel subassembly frame. Two wheels that are axle-mounted to the frame contain integral brake drums and are mounted so as to circumferentially superimpose the drums over brake shoes which are pivotally mounted to the frame. Under normal, non-operational conditions, the levered cam forces the brake shoes into registry and contact with the drums, thereby conditioning a brake-engaged mode. A manual control lever is cable-connected to the frame in a fashion to enable overcoming the spring biasing of the levered cams, thereby releasing the brake. The moment manual force is released, the levered cams return to the normal, brake-engaged mode, thus effecting the invention's purpose.

7 Claims, 3 Drawing Sheets

DEAD MAN'S BRAKE FOR HAND TRUCK

BACKGROUND OF THE INVENTION

1. Field of the Invention

This invention relates generally to braking systems for manually operated pallet trucks and, particularly, to a normally engaged, manually disengagable brake for such a truck. The type of brake system disclosed hereinafter is colloquially referred to as a "dead man's brake", signifying a mechanism that would automatically actuate and engage a braking control in the absence of cognizant action.

2. Discussion of the Relevant Art

Manually operated pallet trucks have been in use for decades. Many innovations have been made in order to make these machines simpler and safer to use. U.S. Pat. No. 4,938,493, issued in July 1990, discloses state-of-the-art regarding manually operable pallet trucks. Therein, a modern, non-motorized pallet truck is defined possessing: a wheel-supported bed; a steering mechanism consisting of a steering tongue yoked to a steering column that is connected to a wheel assembly, the tongue also used in conjunction with a hydraulic subassembly for raising and lowering the truck platform; and several other devices used for jacking the bed, steering the entire assembly and accomplishing the functions set forth by the patentee, but not including the safety mechanism of the instant invention.

Another disclosure, U.S. Pat. No. 3,074,516, sets forth a hand truck that features a braking mechanism which is enabled when the operating handle thereof moves a pushrod into a locked position relative to the truck tongue. Movement of the tongue away from the vertical causes a brake shoe to contact both of the truck's steering wheels. This is a safety feature that engages the brake when manual effort is applied to move the tongue from a safe, rest position. Once the brake is cognitively released by the human operator, it will not automatically reapply itself should the operator fall or become disabled while the truck is in motion and, conceivably, under load. Having an objective, perhaps similar to that of U.S. Pat. No. 3,074,516, but functionally different, is the apparatus for braking a pallet truck and disclosed in Japan (laid open) 5-238393. Therein, there is disclosed a foot-operated brake that utilizes an over-center actuator to urge a shoe/pad into contact with a brake drum that is integrally formed within the wheel. The integral wheel-drum is used in the instant invention.

Because manual movement of heavy loads by use of pallet trucks can be fraught with danger, a need has been perceived for a device which would allow stabilization of the truck when not being moved as well as halting any motion should the operator control be lost suddenly. Such a safety device is embodied in the invention hereinafter disclosed.

3. Incorporation by Reference

To the extent that they disclose commonly known features and functions of manually operable pallet trucks, U.S. Pat. Nos. 3,608,922 and 3,074,516 are hereinafter incorporated by reference.

SUMMARY OF THE INVENTION

A dead man's brake mechanism is combined with a manually operable pallet truck steering wheel assembly. A spaced-plate frame is used to house a steering column mount, an axle and two wheels in side-by-side or dual-wheel arrangement. The wheels feature integral drums which are disposed in close proximity to the frame. Within the frame housing there is provided a bracket for securing a cable and tensioning mechanism so as to allow the cable thereof to control movement of a spring-biased, yoked assembly consisting in two pivotally mounted levered cams. Each of the levered cams physically realize a pivot shaft passing through one of the plates and which has on the end thereof, internal of the frame, a lever (of the yoked pair) and on the other shaft end, outside the frame, an eccentrically attached disc. On each plate, on the outside thereof and proximate a wheel drum surface, an arcuate brake shoe/pad is pivotally mounted by one end thereof. When the pallet truck is not in operation, the levered cam is spring-biased so that the high part of the eccentric cam presses against a free end of the brake shoe and urges the shoe/pad into contact with the wheel drum. Thus, under non-cognitive or "dead man" conditions, the brake is engaged and braking applied to both steering wheels of the machine. When a brake release lever, situated in the handle of the truck, is moved by an operator, the cable is drawn and normally extended biasing springs of the yoked lever assembly are compressed. Compression of the yoked lever springs rotates the eccentric cam discs and the pivotally mounted shoes are, by individual coil springs, urged out of contact with the wheel drums. Release of the brake lever will reverse the aforesaid action automatically by virtue of the lever biasing springs expansion and concomitant caming of the brake shoes/pads back into contact with the drums.

DETAILED DESCRIPTION OF THE PREFERRED EMBODIMENT

Figure 1:
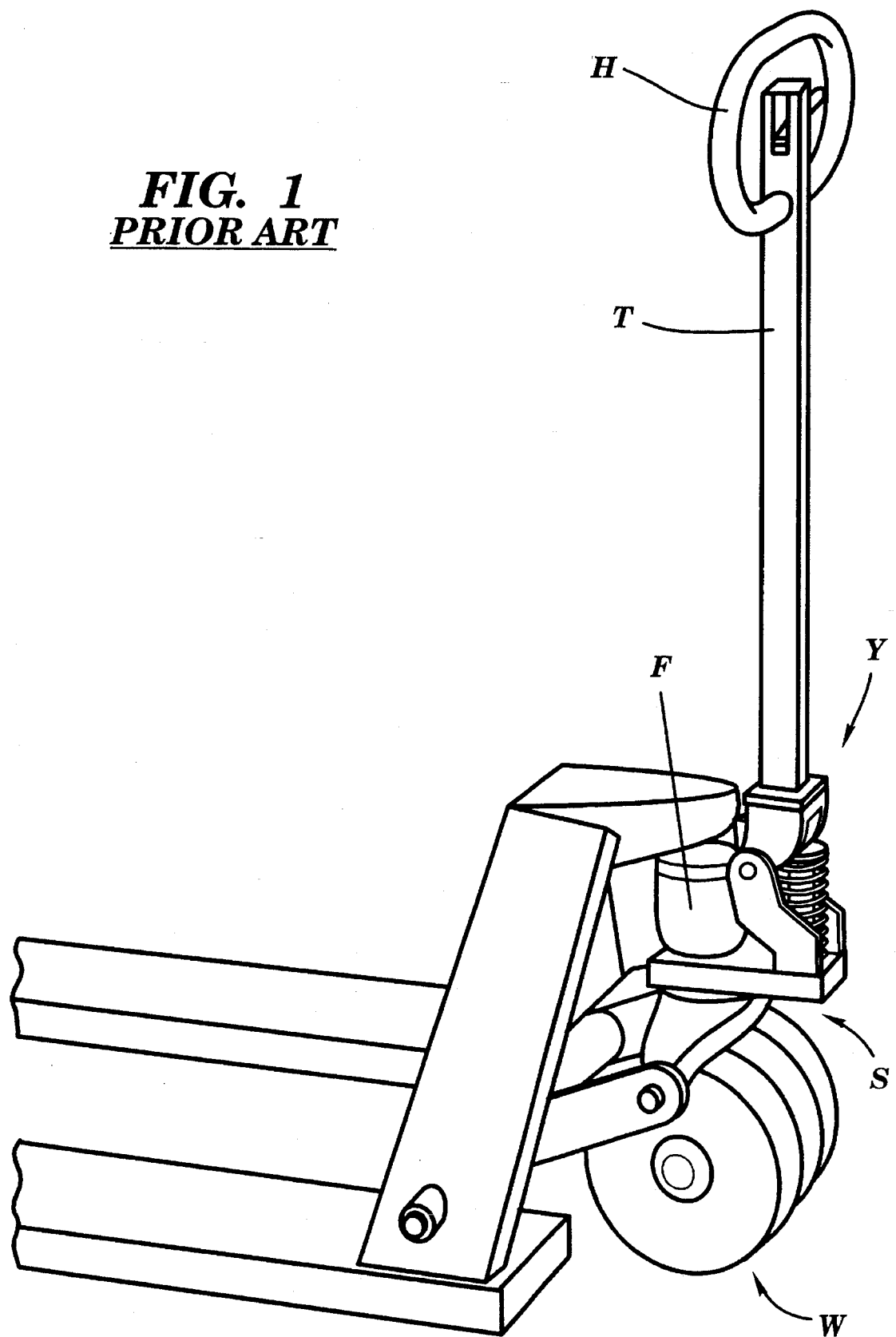
FIG. 1 is an illustration of prior art relative to the invention.

Referring to the drawings, and in particular to FIG. 1, an illustration of the prior art relative to the instant invention presents the reader with a picture of the fundamental features of a manually operable pallet truck. The front end being of primary concern, there is disclosed in the handle H a brake release lever L and depending therefrom the truck tongue T. The tongue terminates in a yoke assembly Y that embraces the steering mechanism S and, in most machines of this genre, the hydraulics subsystem F. Depending below the aforesaid mechanism is the wheel assembly W, which may or may not feature a braking system such as discussed in U.S. Pat. No. 3,074,516, incorporated by reference. Hydraulics subsystems, illustrative of those found in current machines, are described in U.S. Pat. No. 3,608,922, also incorporated by reference.

Figure 2:
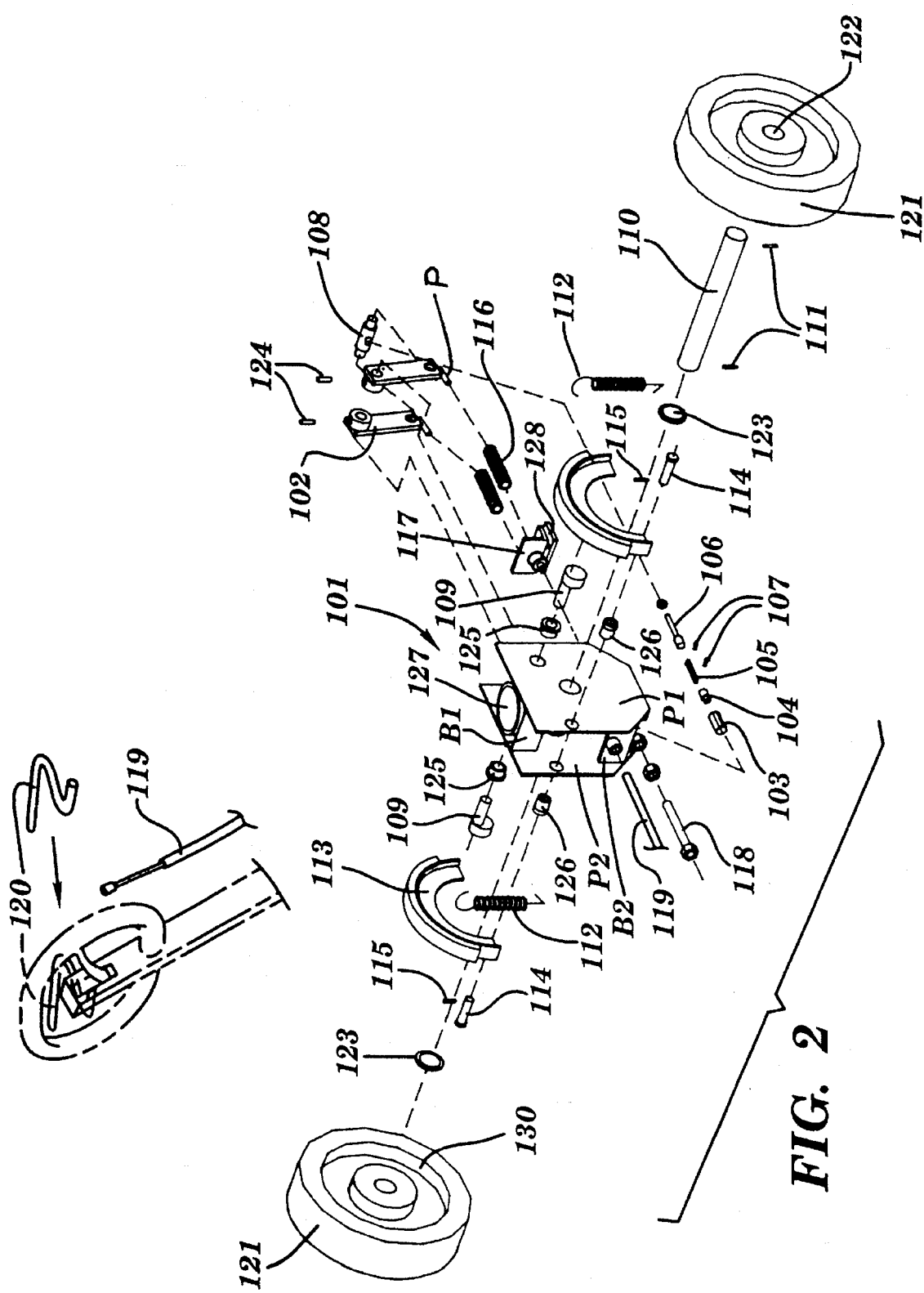
FIG. 2 is an exploded isometric drawing detailing critical parts of the invention.

Detail of the invention 100 is had in the exploded view of FIG. 2. A brake assembly frame 101 (housing) is mechanized as two set-apart plates whose registry is firmly fixed by upper, cable and retainer brackets, B1, B2 and 117, respectively. A steering column mount 127 provides further rigidification of the two plates that principally comprise the assembly frame.

All other parts are now joined to, or housed within, the assembly frame 101. Two levers 102 are yoked by lever connector 108 and each is pivotally mounted inside the assembly frame, one to each plate thereof, on the shaft portions of eccentric cams 109. Bushings 125 are inserted into the plates, as shown, to receive therein the shaft portions of the eccentric cams 109. Set screws 124 are used to secure the eccentric cam shafts to the levers 102. Once the lever 102 and connector 108 assembly is pivotally mounted in the assembly frame 101, the connector ends of the levers, which project pin appendages P, are spaced from a movable bracket retainer 117 by a pair of coil springs 116. When the yoked levers (yoked by connector 108) are projected the full distance from retainer 117 by springs 116, the eccentric cam 109 position relative to the pivoting lever ends may be adjusted by means of set screws 124 so as to maximize the distance from the disc surface of the cam with respect to the axle hole disposed centrally of the two plates of the assembly frame 101. The reason for this adjustment, with the yoked lever assembly in full spring bias, will be better understood when reference is had to FIG. 3.

Having covered the eccentric cam 109 biasing apparatus, the manual actuating mechanism is now considered. Mounted to the handle H is the brake release control lever 120. Depending from the lever is cable assembly 119 which ostensibly terminates at bracket B2, but mechanically is linked through connecting sleeve 103, cable connector 104, and link chain 105 to cable adjuster 106. The link chain 105 device is assembled by use of link pins 107 and the cable adjuster 106 is coupled to lever connector 108. During normal (rest) condition, that is, the pallet truck is not in use, tension springs 116 are fully extended and eccentric cams 109 present the "high" cam surfaces at the furthest point from the centralized axle hole of the assembly frame 101. When the brake release lever 120 is actuated by a human operator, the cable of cable assembly 119 draws lever connector 108 towards 117. Overcoming the extensive biasing force of tension springs 116 causes rotation of the eccentric cams 109 so as to present the lowest cam surfaces to the shoe/pad 113, relative to the cam shafts, and diminish the distance between the assembly frame 101 centralized axle hole and the radially outward projecting cam surfaces. Having described the actuating mechanism of the invention, with respect to the "rest" or safe, non-operative position, the remainder of FIG. 2 apparatus, as it relates significantly to the brake shoe 113 and brake drum 130-wheel 121 subassembly, is given briefly.

Axle 110 transfixes the brake assembly frame 101 through the centralized hole previously mentioned. With eccentric cams 109 inserted in cam bushing 125 and mounted in upper right holes (FIG. 2) of the assembly frame 101, axle 110 mounted in the centralized holes of the frame, bushings 126 are inserted in the remaining upper left holes of the frame and brake shoe/pad assemblies 113 are pivotally mounted thereto by use of shoe pins 114. Once installed, the free end of a shoe/pad 113 is spring-coupled to the assembly frame 101 by retainer spring 112. Thus, the shoe, with respect to the drum 130 will be spring-biased in a retraction mode. This retraction mode is entered and maintained only so long as tension springs 116 remain in compression, a condition existing if and only if manual force applied to the cable assembly 119 has drawn lever connector 108 to closest proximity of retainer bracket 117. When the manual force is released, tension springs 116 will force lever connector 108 away from retainer bracket 117 and outward of the assembly frame housing 101. Consequently, eccentric cams 109 will rotate to present their maximum radial contact with the shoe/pad 113 urging it radially outward into contact with the (circumscribing) brake drum 130. Final assembly of the wheels will, of course, be accomplished with the shoe/pads in the retraction mode. After the shoes have been installed and preliminary adjustments made, the wheels 121, having bushings 122 inserted therein are mounted on the ends of axle 110 allowing drum 130 surfaces to be circumferentially superimposed over the pad portions of shoe/pads 113. Therewith, washers 123 and pins 115 and 111 are used in the conventional manner. Pins used in the assembly at the discretion of the manufacturer/assembler, may be of any conventional type, e.g., cotter, roller (split), etc. The remaining FIG. 2 apparatus will be better defined at FIG. 3. This consists solely in the adjusting bolt 118 and nut mechanism. Suffice it to say that the bolt and nut, threadingly mounted at bracket B2 is used to place appropriate tension on the tension spring 116-levered cam apparatus 102/109.

Figure 3:
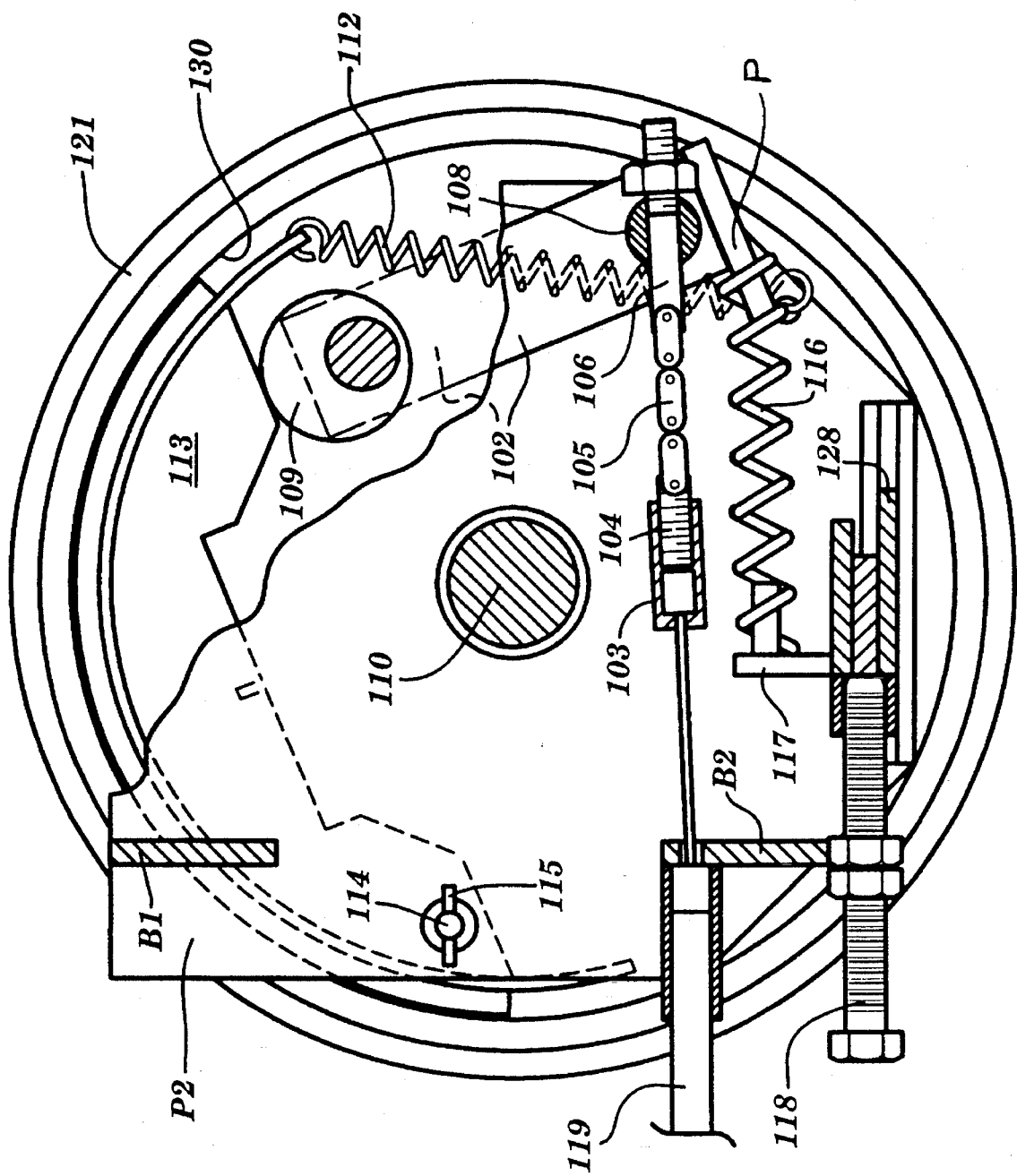
FIG. 3 is a sectioned, partial cutaway, side elevation of the invention.

Finally, referring to FIG. 3, the reader is given a clearer picture of the invention assembly. All critical elements having been identified in FIG. 2, the reader will recognize that he/she is viewing one half of the invention in elevation, having plate P1 and parts mounted thereto removed to expose plate P2 of the assembly frame 101 and its attendant parts, either in visable view or phantom. Steering column mount 127 is unremarkable in that connection of the steering column thereto is well known in the art. The reader may view the function of adjusting bolt 118 and nut, as discussed above. The critical feature of the invention, eccentric cam 109 urging its respective shoe/pad 113 into contact with its respective drum 130 as the distance between lever connector 108 and retainer bracket 117 is maximized, is clearly evident. It is this feature, and its operation absent cognizant human action, that is the principle inculcation of this paper.

Although not embodied herein, it should be understood that the principle and spirit of the invention may be embodied in a hydraulic (master-slave cylindrical) assembly to achieve similar results. If, for example, the master cylinder were actuated by a manual force (irrespective of its location with respect to the handle, tongue, and wheel assemblies), the slave cylinder could be positioned with respect to a levered cam system, as herein disclosed, so that its linear motion, which is one of extension, would lever the cam into the same relationship with the shoe/pad and drum as described above. This hydraulic embodiment has not been realized principally because the reliability of a well maintained mechanical system, in addition to mechanization cost benefits, presents a better and more expedient answer to the need in the industry. Addition of another hydraulic system or subsystem simply is not warranted at this time.

Those ordinarily skilled in the art may make modifications and adapt further applications of the invention without departing from the spirit and principles herein presented. Use of the invention is commended to them consistent with the hereinafter appended claims.

What is claimed is:

1. A brake for immobilizing an idle, manually operable pallet truck comprising:

a frame member transfixed by an axle which bears thereon at least one wheel that has an integral drum means;

a shoe means adapted to be pivotally disposed on the frame member in movable registry and in spring-biased contact with said drum means during all periods of non-operative, idle state conditions of said truck;

a spring-biased shoe movement means adapted to be disposed on said frame for urging the shoe means into said contact with said drum means and conditionally releasing it therefrom; and a shoe release means for actuating the spring-biased shoe movement means to conditionally release the shoe means from said contact with said drum means by overcoming a spring bias of the said shoe movement means.

2. The brake of claim 1 wherein said spring-biased shoe movement means is a pivotally mounted spring-biased levered cam means for maintaining said shoe means in contact with said drum means.

3. The brake of claim 2 wherein said levered cam means comprises a circular member eccentrically transfixed by a short axle that is fixedly engaged by one end of a lever.

4. The brake of claim 3 wherein said shoe release means is a manually operated means for overcoming a bias of the said spring-biased, levered cam means.

5. A dead man braking mechanism for a hand operable pallet truck comprising:

a spaced-plate base;

an axle transfixing the base and bearing thereon at least one wheel that includes a drum means;

at least one shoe member pivotally mounted to the base for spaced registry and spring-biased engagement with said drum means;

a spring-biased lever means with a first end thereof pivotally disposed on the base proximate the shoe member and moveable between a first brake-off position and a second brake-on position so that a cam element disposed on said first end of said lever means urges the shoe member into contact with the drum means when said lever means is in said second brake-on position; and an operator-controlled positioning means attached to a second end of the lever means for moving the lever to said first brake-off position.

6. The mechanism of claim 5 wherein said operator-controlled positioning means comprises a manually actuated cable linkage attachable proximate said second end of the lever means.

7. In combination with a manually operable pallet truck steering wheel assembly, an improvement comprising:

at least one wheel of said assembly defined by an integral drum means and rotatably mounted proximate a frame of said assembly;

at least one shoe means pivotally mounted proximate one end thereof to said frame and responsive to a frame mounted, spring-biased levered cam means for biasing said shoe means in contact with said drum means, said levered cam means further comprising an eccentrically and pivotally mounted disc coupled to a lever first end with a second end of said lever coupled to a manual force application means; and a manual force application means for an operator of said truck to overcome biasing of said spring-biased actuation subassembly.

\* \* \* \* \*